(12) United States Patent
Ellis et al.

(10) Patent No.: US 7,925,791 B2
(45) Date of Patent: Apr. 12, 2011

(54) RECOVERABLE ERROR DETECTION FOR CONCURRENT COMPUTING PROGRAMS

(75) Inventors: Edric Ellis, Huntingdon (GB); Jocelyn Luke Martin, Burwell (GB); Halldor Narfi Stefansson, Natick, MA (US)

(73) Assignee: The Math Works, Inc., Natick, MA (US)

( * ) Notice: Subject to any disclaimer, the term of this patent is extended or adjusted under 35 U.S.C. 154(b) by 1076 days.

(21) Appl. No.: 11/488,432

(22) Filed: Jul. 17, 2006

(65) Prior Publication Data

US 2008/0016249 A1    Jan. 17, 2008

(51) Int. Cl.
*G06F 15/16* (2006.01)
(52) U.S. Cl. ........ 709/248; 709/201; 709/203; 709/208; 709/224; 714/12; 714/48; 714/100
(58) Field of Classification Search .......... 709/201–203, 709/208, 223–224, 248; 714/1–2, 12, 34–36, 714/100, 48; 713/375
See application file for complete search history.

(56) References Cited

U.S. PATENT DOCUMENTS

| | | | | |
|---|---|---|---|---|
| 4,816,989 | A * | 3/1989 | Finn et al. | 709/248 |
| 4,914,657 | A * | 4/1990 | Walter et al. | 709/248 |
| 5,768,538 | A * | 6/1998 | Badovinatz et al. | 709/201 |
| 5,987,477 | A * | 11/1999 | Schmuck et al. | 709/203 |
| 6,029,205 | A * | 2/2000 | Alferness et al. | 718/103 |
| 6,216,174 | B1 | 4/2001 | Scott et al. | |
| 6,430,600 | B1 * | 8/2002 | Yokote | 709/203 |
| 6,651,242 | B1 * | 11/2003 | Hebbagodi et al. | 714/2 |
| 6,718,484 | B1 * | 4/2004 | Kodera | 714/35 |
| 7,117,248 | B1 * | 10/2006 | Jordan, Jr. | 709/206 |
| 7,191,294 | B2 * | 3/2007 | Nakamura et al. | 713/375 |
| 2005/0278620 | A1 | 12/2005 | Baldwin et al. | |
| 2006/0200730 | A1 | 9/2006 | Daugherty | |
| 2007/0174484 | A1 | 7/2007 | Lussier et al. | |
| 2007/0260909 | A1 | 11/2007 | Archer et al. | |

OTHER PUBLICATIONS

Johnson, T. et al., "Cyclical cascade chains: a dynamic barrier synchronization mechanism for multiprocessor systems," *Proceedings of the 15th International Parallel and Distributed Processing Symposium*, pp. 2061-2068 (2001).
Klaiber, Alexander et al., "A Comparison of Message Passing and Shared Memory Architectures for Data Parallel Programs," retrieved at citeseer.ist.psu.edu/cache/papers/cs/7993.zSzzSzstudents.cs.byu.eduzSz~clementzSzcs584zSzklaiber.pdf/klaiber94comparison.pdf (1994).
Invitation to Pay Additional Fees for Application No. PCT/US2007/016170, dated Feb. 19, 2008.

* cited by examiner

*Primary Examiner* — Bharat N Barot
(74) *Attorney, Agent, or Firm* — Nelson Mullins Riley & Scarborough LLP; Kevin J. Canning (57) ABSTRACT

The present invention provides a system and method for detecting communication error among multiple nodes in a concurrent computing environment. A barrier synchronization point or regions are used to check for communication mismatch. The barrier synchronization can be placed anywhere in a concurrent computing program. If a communication error occurred before the barrier synchronization point, it would at least be detected when a node enters the barrier synchronization point. Once a node has reached the barrier synchronization point, it is not allowed to communicate with another node regarding data that is needed to execute the concurrent computing program, even if the other node has not reached the barrier synchronization point. Regions can also be used to detect a communication mismatch instead of barrier synchronization points. A concurrent program on each node is separated into one or more regions. Two nodes can only communicate with each other when their regions are compatible. If their regions are not compatible, then there is a communication mismatch.

53 Claims, 5 Drawing Sheets

RECOVERABLE ERROR DETECTION FOR CONCURRENT COMPUTING PROGRAMS

TECHNICAL FIELD

The present application generally relates to a concurrent computing and more specifically to providing detection of communication error in a concurrent computing environment.

BACKGROUND OF THE INVENTION

MATLAB® is a product of The MathWorks, Inc. of Natick, Mass., which provides engineers, scientists, mathematicians, and educators across a diverse range of industries with an environment for technical computing applications. As a desktop application, MATLAB® allows scientists and engineers to interactively perform complex analysis and modeling in their familiar workstation environment. With many engineering and scientific problems requiring larger and more complex modeling, computations accordingly become more resource intensive and time-consuming. However, a single workstation can be limiting to the size of the problem that can be solved, because of the relationship of the computing power of the workstation to the computing power necessary to execute computing intensive iterative processing of complex problems in a reasonable amount of time.

For example, a simulation of a large complex aircraft model may take a reasonable amount of time to run with a single workstation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations of the model to analyze the problem as desired and the single workstation would take an unreasonable or undesirable amount of time to perform these computations. Therefore, it is desirable to perform a computation concurrently using multiple workstations when the computation becomes so large and complex that it cannot be completed in a reasonable amount of time on a single workstation.

In another example, an application can have a mathematical function that is to be integrated in parallel using a quadrature algorithm. In this case, the mathematical function must be evaluated a large number of times in order to calculate the integral to a sufficient degree of accuracy, and each evaluation of the mathematical function may take a large amount of time. To perform the integration in a reasonable amount of time, it would be desirable to have multiple workstations working on the integration in parallel, and communicating partial results with one another until a result with sufficient accuracy is reached.

Applications that are traditionally used as desktop applications, such as MATLAB®, need to be modified to be able to utilize the computing power of concurrent computing, such as parallel computing and distributed computing. Each machine or workstation needs to have its local copy of the application or at least the part of the application that has the necessary functionality for the machine or workstation to perform concurrent computing and the requested computations. Between the different instances of the application, there need to be a way to communicate and pass messages between the machines and workstations so that the multiple machines or workstations in the concurrent computing environment can collaborate with each other.

Message passing is a form of communication used in concurrent computing for different processes on the same or different machines/workstations to communicate with each other in the concurrent computing environment. Communication is made by the sending of messages from one machine/workstation to another machine/workstation. Forms of messages include function invocation, signals, and data packets. One example of a message passing method that establishes a communication channel between machines or workstations is Message Passing Interface (MPI).

When developing concurrent computing programs, such as parallel programs, especially in the "single program, multiple data" model, it is possible to introduce communication mismatches among the multiple nodes in a concurrent computing environment. Communication mismatch can be due to send/receive inconsistency caused by an error in program execution flow, such as a message was not sent because one of the processes exits a loop in an untimely manner. A mismatch can also be due to incorrect sender or receiver. A bug in the parallel program also can cause a communication mismatch. Some errors are non-deterministic, such as ones caused by differences in execution times caused by different data inputs. Errors can easily occur when there is a change in execution environment, such as a change in parallel platform. A communication mismatch in one part of an application may result in errors becoming apparent in a separate part of the application because the communication mismatch may leave some undeliverable messages in a pending state—when these messages are eventually received, they will not be what the receiver expects. A deadlock can possibly occur due to communication mismatch and causes the application to hang. As building many-core multi-processor systems and clusters becomes more popular, debugging a communication mismatch in a concurrent computing program becomes exponentially harder.

SUMMARY OF THE INVENTION

Some embodiments of the present invention provide a system and method for detecting communication error among multiple nodes in a concurrent computing environment. A checkpoint called barrier synchronization point is used to check for any communication mismatch in a concurrent computing program. The barrier synchronization point can be placed anywhere in a concurrent computing program as desired. Once a node has reached the barrier synchronization point, the node suspends execution and becomes idle to wait for other nodes to reach the barrier synchronization point as well. No node can leave the barrier synchronization point until all nodes have entered the barrier synchronization point. If a node attempts to initiate communication with another node that has already entered the barrier synchronization point, an error is raised immediately. Once all the nodes have reached the barrier synchronization point, any message in the send/receive buffer is flushed before resuming to normal execution to ensure that any communication mismatch before the barrier synchronization point does not continue past the barrier synchronization point. Each message to be flushed represents a communication mismatch and a warning or an error can be issued.

Alternatively, instead of barrier synchronization points, regions can be used to practice the present invention. Nodes that use the region-based implementation do not suspend execution when they are leaving one region and entering another. In one embodiment of the present invention, each message is packaged with information that identifies the region that the sending node is in so that the receiving node can determine if such message can be successfully received without error. The receiving node checks if the region information in the message is compatible with the region that the receiving node is currently in and an error is raised if there is an incompatibility between the regions. In another embodiment of the present invention, a sending node queries the region that the receiving node is in and compares the region of the receiving node with the region that the sending node is currently in. If the receiving node is in a compatible region with the sending node, then a message is sent from the receiving node to the sending node. However, if the receiving node is in an incompatible region with the sending node, then a communication mismatch is detected. In yet another embodiment of the present invention, a message is sent by a sending node without information on the region that the sending node is in and the receiving node queries the region that the sending node is in before the receiving node successfully receives the message. If the region of the receiving node is compatible with the region of the sending node, then the receiving node successfully receives the message. If the region of the receiving node is incompatible with the region of the sending node, then a communication mismatch is detected.

In one embodiment of the present invention, a method for detecting a communication error among a plurality of nodes in a concurrent computing environment is provided. The method includes executing a concurrent computing program; obtaining an instruction by a first node of the plurality of nodes to enter a barrier synchronization point; suspending execution of the concurrent computing program by the first node; sending a message by the first node to the remaining nodes in the plurality of nodes to inform that the first node has entered the barrier synchronization point; checking if all the remaining nodes have entered the barrier synchronization point; and if all the remaining nodes have entered the barrier synchronization point, resuming execution of the concurrent computing program. If all the remaining nodes have not entered the barrier synchronization point, the method further includes waiting for all the remaining nodes to enter the barrier synchronization point before resuming execution of the concurrent computing program.

In one aspect of the present invention, the method further includes flushing any undelivered messages before resuming execution of the concurrent computing program. The method may also further include discarding any message received during suspension of the execution of the concurrent computing program before resuming execution of the concurrent computing program.

In another embodiment of the present invention, a method for detecting a communication error among a plurality of nodes in a concurrent computing environment is provided, where the method includes executing a concurrent computing program; attempting to communicate with the first node regarding data for the concurrent computing program, wherein the first node has entered a barrier synchronization point; and detecting a communication error. The attempted communication can be a communication for sending data to the first node or a communication for receiving data from the first node.

In one aspect of the present invention, the method further includes checking the state of the first node before attempting to receive data from the first node. The method may also include receiving a message from the first node informing that the first node has entered the barrier synchronization point. The method may further include obtaining an instruction to enter the barrier synchronization point; and suspending the execution of the concurrent computing program.

In yet another embodiment of the present invention, a computer-readable medium holding computer-executable instructions for causing a computing device to detect a communication error among a plurality of nodes in a concurrent computing environment is provided, where the instructions include instructions for executing a concurrent computing program; obtaining an instruction by a first node of the plurality of nodes to enter a barrier synchronization point; suspending execution of the concurrent computing program by the first node; sending a message by the first node to the remaining nodes in the plurality of nodes to inform that the first node has entered the barrier synchronization point; checking if all the remaining nodes have entered the barrier synchronization point; and if all the remaining nodes have entered the barrier synchronization point, resuming execution of the concurrent computing program.

In still another embodiment of the present invention, a computer-readable medium holding computer-executable instructions for causing a computing device to detect a communication error among a plurality of nodes in a concurrent computing environment is provided, where the instructions include instructions for executing a concurrent computing program; attempting to communicate with the first node regarding data for the concurrent computing program, wherein the first node has entered a barrier synchronization point; and detecting a communication error.

In a further embodiment of the present invention, a system for detecting a communication error among a plurality of nodes in a concurrent computing environment is provided. The system includes a plurality of nodes executing a concurrent computing program; and a communication error detector inserting a barrier synchronization point in the concurrent computing program to check for communication error among the plurality of nodes, the communication error detector detects an error when a first node of the plurality of nodes attempts to communicate with a second node of the plurality of nodes when the second node has reached the barrier synchronization point.

In yet another embodiment of the present invention, a method for detecting a communication mismatch between two nodes in a concurrent computing environment is provided. The method includes executing a concurrent computing program; and sending a message by a sending node to a receiving node, the message includes information identifying a region the sending node is in. In one aspect of the present invention, the method further includes receiving an error indicating that the message is received with error due to an incompatible region that the receiving node is in. In still another aspect of the present invention, the method further includes detecting a change in the region that the sending node is in, the region changes from a first region to a second region; and informing the receiving node that the sending node is in a second region.

In still another embodiment of the present invention, a method for detecting a communication mismatch between two nodes in a concurrent computing environment is provided, where the method includes executing a concurrent computing program; querying a current region of a receiving node by a sending node; and if the current region of the receiving node is compatible with a current region of the sending node, sending a message from the sending node to the receiving node. In one aspect of the present invention, if the current region of the receiving node is incompatible with the current region of the sending node, the method further includes receiving an error identifying a communication mismatch.

In yet another embodiment of the present invention, a method for detecting a communication mismatch between two nodes in a concurrent computing environment is provided, where the method includes executing a concurrent computing program; querying a current region of a sending node by a receiving node; and if the current region of the sending node is compatible with a current region of the receiving node, receiving a message from the sending node by the receiving node. In one aspect of the present invention, if the current region of the receiving node is incompatible with the current region of the sending node, the method further includes receiving an error identifying a communication mismatch.

In still another embodiment of the present invention, a system for detecting a communication error among a plurality of nodes in a concurrent computing environment is provided. The system includes a plurality of nodes executing a concurrent computing program; and a communication error detector dividing the concurrent computing program into one or more regions to check for communication error among the plurality of nodes, the communication error detector detects an error when a first node of the plurality of nodes attempts to communicate with a second node of the plurality of nodes when a region of the first node is not compatible with a region of the second node. In one embodiment of the present invention, the first node attempts to send a message to the second node, and information regarding the region of the first node is included in the message.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

Some embodiments of the present invention provide a system and method for detecting communication error among multiple nodes in a concurrent computing environment. A node is used herein to refer to a concurrent computing lab (described later). A barrier synchronization point or regions can be used to check for communication mismatch. The barrier synchronization can be placed anywhere in a concurrent computing program. If a communication error occurred before the barrier synchronization point, it would at least be detected when a node enters the barrier synchronization point. Once a node has reached the barrier synchronization point, it is not allowed to communicate with another node regarding data that is needed to execute the concurrent computing program, even if the other node has not reached the barrier synchronization point. Before leaving the barrier synchronization point and resuming execution of the concurrent computing program, all messages in the send/receive buffer can be flushed so that communication error do not propagate beyond the barrier synchronization point. The concurrent computing nodes can then resume and continue execution of the concurrent computing program and communicate data with each other again. The concurrent computing application does not need to be aborted when a communication error is detected. In another aspect of the present invention, a program may be divided into regions instead of using the barrier synchronization points to detect a communication mismatch. If a node attempts to communicate with another node that is currently in an incompatible region, then an error is raised to signal the communication mismatch.

The following illustrative embodiments will be described for illustrative purposes relative to a MATLAB®-based technical computing environment. Although the illustrative embodiment will be described relative to a MATLAB®-based application, one of ordinary skill in the art will appreciate that the present invention may be applied to parallel or distributed processing of technical or non-technical computing tasks with other technical or non-technical computing environments. Examples of technical computing environments that are suitable to practice with the present invention include ones from software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc, or R from The R Project for Statistical Computing of Australia, or Scilab from Institut national de recherche en informatique et en automatique (INRIA) of France, or Octave from Univeristy of Wisconsin of Madison, Wis. or products for embedded systems from OPAL-RT Technologies, Inc. of Ann Arbor, Mich.

Some embodiments of the present invention can also be applied to an embedded control system or a network system of embedded controls. An embedded control system includes a physical system that is being controlled by computing hardware, such as a microprocessor. The computing hardware is embedded in the physical system by means of sensors and actuators. One embedded control system may contain multiple computing hardware entities and these hardware entities communicate to achieve a desired behavior of the physical system. These hardware entities can work in a concurrent computing environment (discussed below). The communication among the multiple computing hardware entities can synchronize in time and the communication of information can be done periodically or aperiodically. For the overall system to behave as desired, the communication needs to be validated and missed points of communication need to be identified and the incorrectly communicated information needs to be acted upon, such as discarding the incorrectly communicated information and issuing a warning.

Some embodiments of the present invention may apply to concurrent processing of streaming data. The data can be processed in real-time. Alternatively, data can be stored first before it is being processed. For example, a fast Fourier transform may be used to analyze the frequency spectrum of the measured values from a sensor. In case of the on-line processing, real-time processing is typically performed. Real-time processing may be employed in off-line processing. The measured values from a sensor may be supplied to the nodes in the concurrent computing environment as a stream of data and the processing may be performed by a number of concurrent computations that exploit the communication error and warning detection of the present invention.

Figure 1:
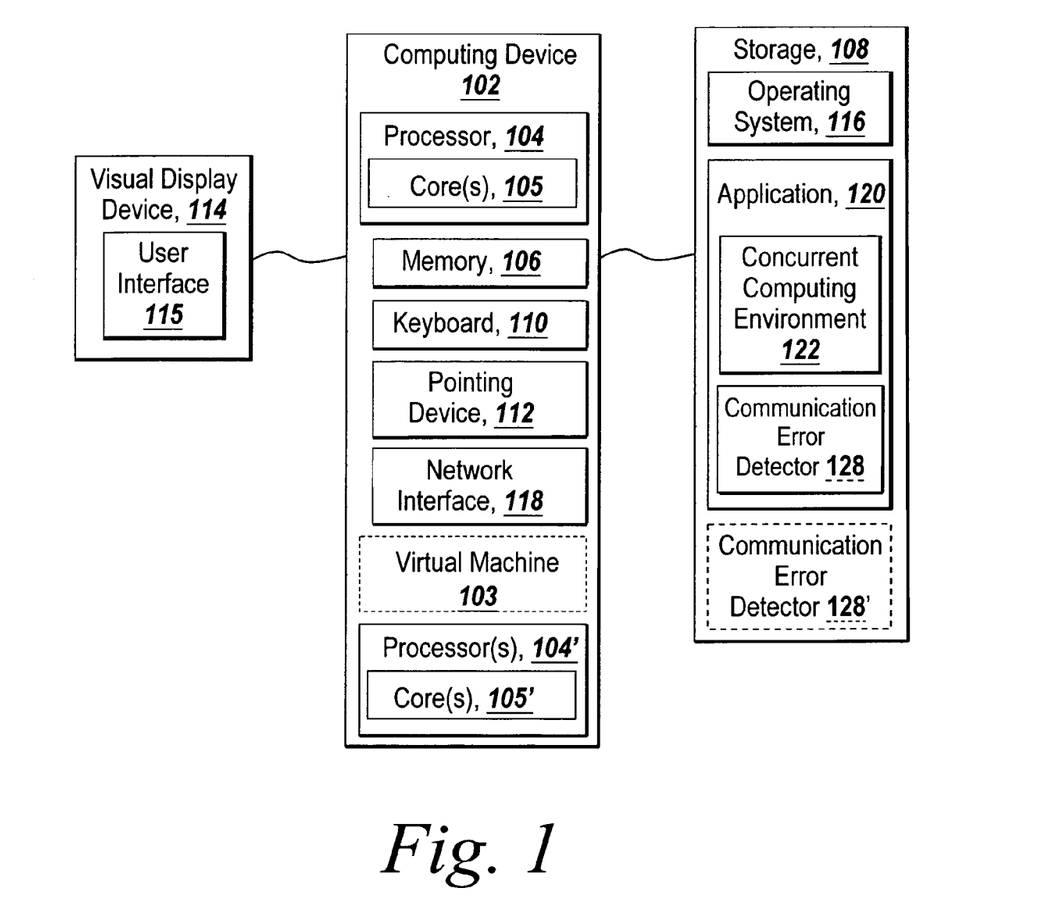
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104, and optionally, one or more processor(s) 104' for executing software stored in the memory 106, and other programs for controlling system hardware. Processor 104 and processor(s) 104' can each be a single or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as Field Programming Gate Array (FPGA), Application Specific Integrated Circuit (ASIC), Application Specific Instruction Processor (ASIP), Digital Signal Processor (DSP), and General Purpose Processor (GPP), may also be used for executing code and/or software. A hardware accelerator, such as implemented in an ASIC, FPGA, or the like, can additionally be used to speed up the general processing rate of the computing device 102.

The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110, a touchscreen, a camera, a microphone, and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other computer readable media, for storing an operating system 116 and other related software, and for storing application 120, such as parallel computing with MATLAB® or distributed computing with MATLAB®.

Application 120 may be running a concurrent computing environment 122 to enable concurrent computing on the computing device 102. The application 120 can also include a communication error detector 128 for detecting a communication error among multiple nodes in the concurrent computing environment 122. When a communication error is detected, a warning can be issued. One of ordinary skill in the art will appreciate that communication error detector 128 can be adapted to be included as part of the application 120, or it can be a stand-alone application/module/script/program that responds to calls from the application 120, such as communication error detector 128'. Additionally, the operating system 116 and application 120 can be run from a computer readable media, such as, for example, KNOPPIX®, a bootable CD for GNU/Linux.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 2:
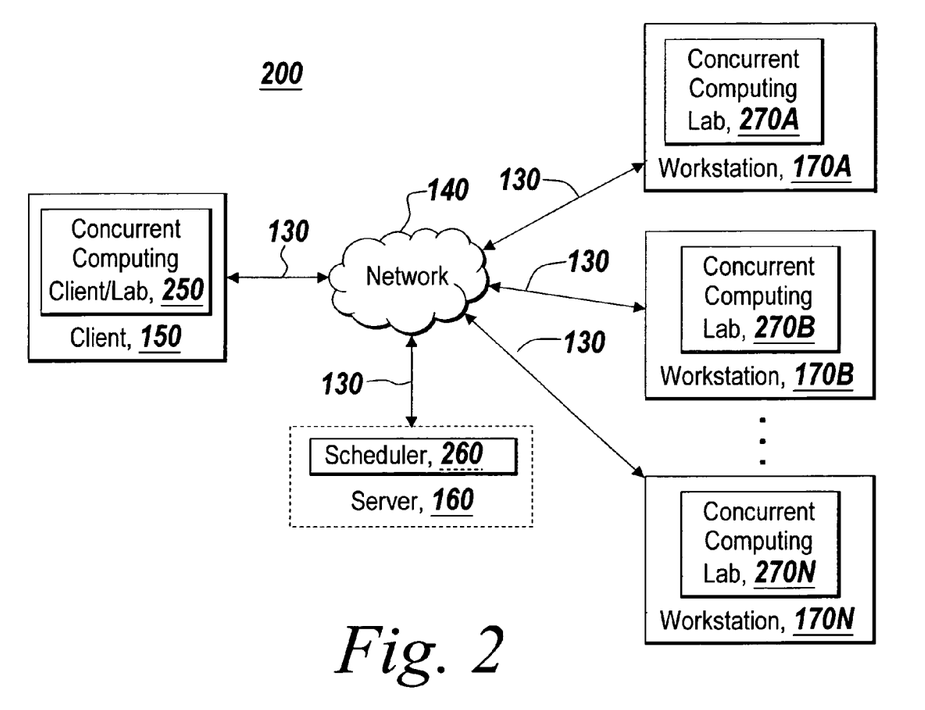
FIG. 2 a block diagram of a concurrent computing system including more than one computing device for practicing an embodiment of the present invention.

FIG. 2 depicts a concurrent computing system 200 that is suitable for practicing the illustrative embodiment of the present invention. In brief overview, the system 200 comprises a concurrent computing client 250 running on a client 150, concurrent computing labs 270A-N on workstations 170A-N, and optionally a server 160. A concurrent computing lab is a process, such as an instance of an application, executing on a computing resource where the process performs distributed computing or parallel computing. A computing resource can be, but not limited to, a processor, a computer system, or other hardware with computational capabilities, such as instruments for data acquisition (oscilloscopes, waveform generators, etc.). More than one concurrent computing lab can be run on a single computing resource. More than one concurrent computing lab can also be run on a single core of a processor. The concurrent computing client 250 is in communication with the concurrent computing labs 170A-N and server 160 through network communication channels 130 over a network 140. One of ordinary skill in the art will appreciate that workstations 170A-N, server 160, and client 150 may have one or more concurrent computing lab. Each of the concurrent computing labs 170A-N is an instance of the application 120.

The concurrent computing client 250 can be a technical or non-technical computing software application. Concurrent computing client 150 may provide a technical computing and/or graphical modeling environment for generating block diagram models and to define mathematical algorithms for simulating models. The concurrent computing client 250 may include all or a portion of the functionality provided by the stand-alone desktop application of MATLAB®. Additionally, the concurrent computing client 250 can be any of the software programs available in the MATLAB® product family. Furthermore, the concurrent computing client 250 can be a custom software program or other software that accesses functionalities of software programs in the MATLAB® product family via an interface, such as an application programming interface (API), or by other means. One of ordinarily skill in the art will appreciate the various combinations of client types that may access the functionalities of the system.

In one embodiment of the present invention, concurrent computing client 250 is also a concurrent computing lab. In such a configuration, communication channels 15 are set up among the concurrent computing labs (concurrent computing client 250 and concurrent computing labs 270A-N). Each of the concurrent computing labs (including the concurrent computing client 250) has its local copy of a computer program that is executed in the corresponding concurrent computing labs, so there is no main concurrent computing lab that distributes executions to the other concurrent computing labs. Alternatively, a copy of the computer program can be accessed through a network connection. The local copy of the program for each lab may or may not be identical. The concurrent computing client 250 can additionally have the functionality to accept inputs and/or commands from a user related to the computer program using a tool such as an Integrated Development Environment (IDE). The concurrent computing client 250 and concurrent computing labs 270A-N can be configured to perform distributed computing or parallel computing.

In one embodiment of the present invention, functions can be defined, by the concurrent computing client 250 with an application programming interface (API) and/or programming language, representing a technical computing task to be executed by either a technical computing environment local to the client 150, or remote on the workstations 270A-N. Tasks can be declared on a concurrent computing client 250 and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

In one aspect of the present invention, a task can be directly distributed by the concurrent computing client 250 to one or more computing resources, such as workstations 170A-N. A computing resource performs technical computing on a task and may return a result to the concurrent computing client 250.

In another aspect of the present invention, the system includes a server 160 on which a scheduler 260 runs. The scheduler 260 can be a scheduler provided with application 120, a generic scheduler, or a third-party scheduler that is designed and provided by a company or individual that may not provide application 120. For example, given that application 120 is parallel computing with MATLAB® by The MathWorks, Inc. of Natick, Mass., a third-party scheduler can be MPI Exec, LSF, Condor, Microsoft Compute Cluster Server, or PBS. The server 160 communicates over a network communication channel 130 on the network 140 to the workstations 170A-N. One of ordinary skill in the art will appreciate that any of the workstations 170A-N may include more than one technical computing lab to practice the present invention. Additionally, client 150 and server 160 may also include one or more concurrent computing labs.

The scheduler 260 comprises one or more application software components to provide for the automatic distribution of tasks from the concurrent computing client 250 to one or more of the concurrent computing labs 270A-N. The scheduler 260 allows the concurrent computing client 250 to delegate the management of task distribution to the scheduler 260. The scheduler may also set up for concurrent computing client 250 the concurrent computing labs 270A-N by using the information received from the concurrent computing client 250 regarding the number of concurrent computing labs needed and other configuration information. Hence, the concurrent computing client 250 does not need to know the specifics of the concurrent computing labs 270A-N. The concurrent computing client 250 can define a function to submit the task to the scheduler 260, and get a result of the execution of the task. As such, the scheduler 260 provides a level of indirection between the concurrent computing client 250 and the concurrent computing labs 270A-N.

This eases the distributed programming and integration burden on the concurrent computing client 250. The concurrent computing client 250 does not need to have prior knowledge of the availability of the workstations 170A-N. For multiple task submissions from the concurrent computing client 250, the scheduler 260 can manage and handle the delegations of the tasks to the concurrent computing labs 270A-N and hold the results of the tasks on behalf of the concurrent computing client 250 for retrieval after the completion of technical computing of all the tasks distributed by concurrent computing client 250 or at desired intermediate points. In an alternative implementation, the concurrent computing labs 270A-N may provide concurrent computing client 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a concurrent computing client 250, submitting those tasks making up the job, and obtaining the results of each of the tasks until the job is completed. One of ordinary skill in the art will recognize that the functions and operations of the scheduler 260 can be separated into various software components, applications and interfaces. Additionally, the functions and operations of the scheduler 260 may reside on either the concurrent computing client 250 or one of the concurrent computing labs 270A-N instead of the server 160.

Additionally, each of the client 150, the server 160, and the workstations 170A-N can be running the same or different operating systems with the same or different processors. For example, the client 150 can be running Microsoft® Windows®; the server 160 can be running a version of Unix, and the workstations 170A-N a version of Linux. Alternatively, each of the client 150, the server 160 and the workstations 170A-N can be running Microsoft® Windows®. One of ordinarily skill in the art will recognize the various combinations of operating systems and processors that can be running on any of the computing devices (client 150, server 160, workstations 170A-N). One or ordinary skill in the art will also appreciate that some computing device may not have an operating system. For example, an FPGA without an operating system can be configured to perform computations synchronously or asynchronously and put the data on a communication bus.

Figure 3:
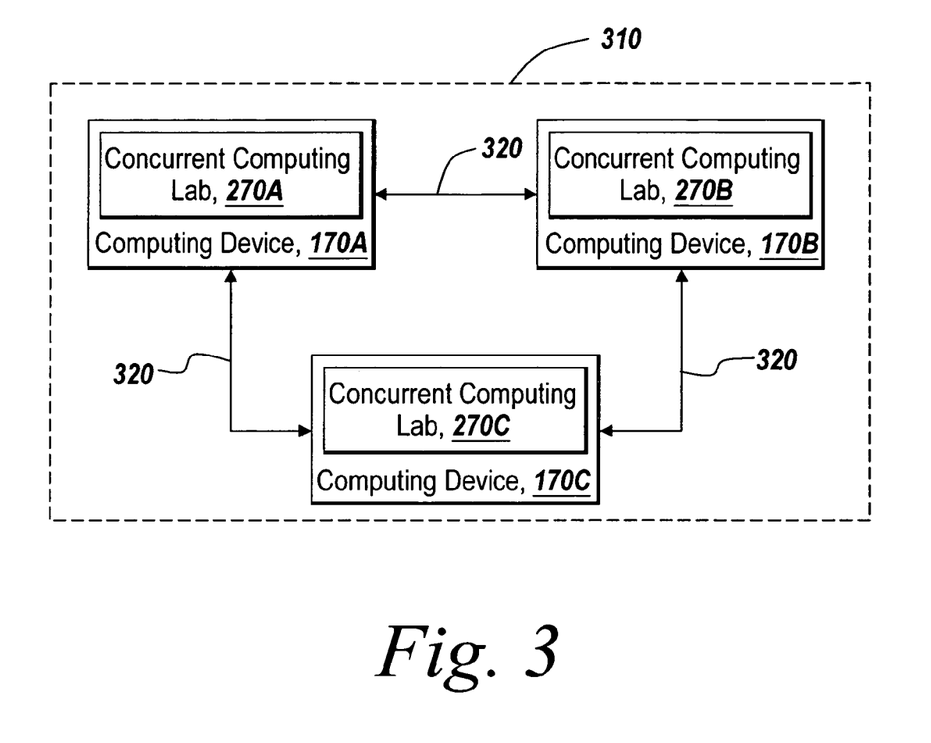
FIG. 3 a block diagram illustrating a collaboration of concurrent computing labs in the illustrative embodiment of the present invention.

FIG. 3 illustrates a collaboration of the concurrent computing labs 270A, 270B, and 270C. The concurrent computing labs 270A, 270B, and 270C establish a communication channel 320 and form a collaboration 310. The concurrent computing labs 270A, 270B, and 270C may communicate via an MPI communication channel 320. In one embodiment of the present invention, a real time MPI (MPI/RT) is used. In other embodiments, the concurrent computing labs 270A, 270B, and 270C can interface via socket based communications over TCP/IP implementing a custom message specification. In further embodiments, the concurrent computing labs 270A, 270B, and 270C may communicate using any available messaging communications products and/or custom solutions that allow the sending and receiving of messages among the concurrent computing labs 270A, 270B, and 270C. In certain embodiments, the communication channel 320 may include a file interfacing mechanism such as reading and writing to files on a network accessible directory or common file system. Furthermore, the concurrent computing labs 270A, 270B, and 270C can each be waiting or listening for messages from other concurrent computing labs 270A, 270B, and 270C. One of ordinary skill in the art will recognize the various types of interfaces to communicate messages among the concurrent computing labs 270A, 270B, and 270C. The communication among the concurrent labs 290A-C may be done over a bus using interfaces such as PCMCI, Flexray, Firewire, RS-232.

In one embodiment of the present invention, the collaboration is dynamic. In other words, a user can modify or change the size of the collaboration by adding another computing resource. The user may be provided on the client 150 with a user interface to modify or change the size of the collaboration or designate a specific resource to add or remove from the collaboration. In another embodiment of the present invention, the client 150 can forward the information to the scheduler 260, which will determine a concurrent computing lab to be added or removed from the collaboration.

Figure 4:
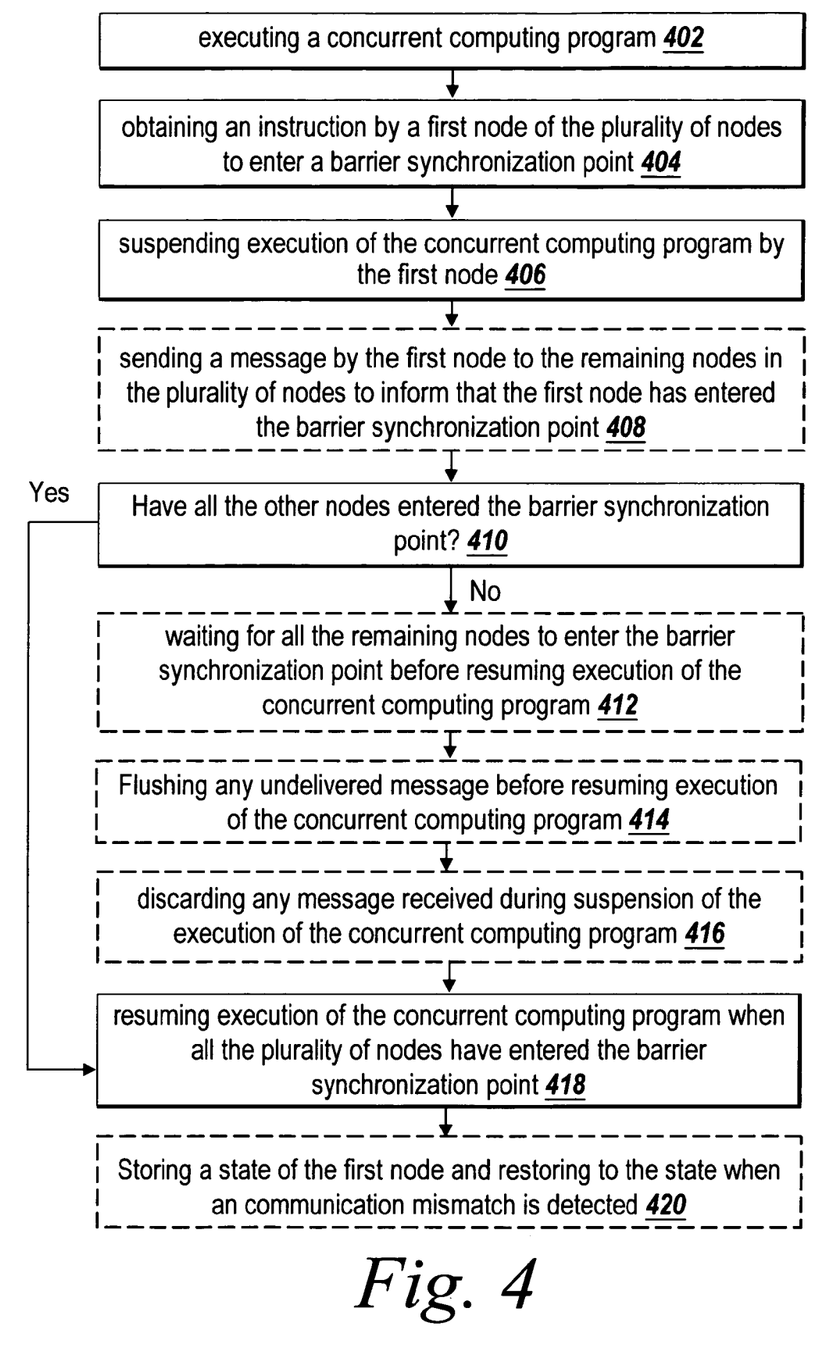
FIG. 4 illustrates a flowchart depicting steps taken when a node reaches a barrier synchronization point according to one embodiment of the present invention.

FIG. 4 illustrates a flowchart depicting steps taken to practice one aspect of the present invention. In a concurrent computing environment having multiple nodes, a first node executes a concurrent computing program in step 402. A concurrent computing program can have one or more lines of code that may or may not be part of a file or the same application. Code that is typed in a common line can also be considered as a concurrent computing program. A concurrent computing program requires one or more concurrent computations to be performed. In one embodiment of the present invention, all the nodes in the concurrent computing environment execute the same concurrent computing program. The nodes may or may not execute the same portions of the concurrent computing program. The nodes executing the same or different portions of the concurrent computing program may need to communicate with each other to successfully execute concurrent computing program.

In step 404, the first node obtains an instruction to enter a barrier synchronization point. The barrier synchronization point can be inserted manually by a user into the concurrent computing program. Alternatively, the barrier synchronization point can be inserted automatically by the communication error detector 128. In one embodiment of the present invention, the positions to insert the barrier synchronization points can be dynamically defined. A user can use a rule-based system to define where barrier synchronization points are inserted. The barrier synchronization point is used to detect if there is any communication error among the nodes. If a communication error is detected, a warning can be issued. The warning can be accompanied by an error code that helps a user to identify the type of communication error that was detected. When a node reaches the barrier synchronization point, the node waits for other nodes in the concurrent computing environment to reach the barrier synchronization point before continuing the execution of the concurrent computing program so that the communication among the nodes can be synchronized. For example, the following pseudo code shows how a barrier synchronization point can be used in one embodiment of the present invention.

```
/*
 * Here is an approximation to the dispatch loop that executes on
 * each node/lab to receive commands to execute, execute them, then
 * perform the necessary communication mismatch error detection.
 */
void dispatchLoop( ) {
    /*
     * Run the loop forever...
     */
    while( true ) {
        /*
         * This command can be a single command to be executed in
         * parallel as typed by the user. The command can be entered
         * in a command window, and then distributed to the
         * nodes/labs.
         */
        command = receiveNextCommand( );
        /*
         * Next, an application (in the MATLAB case, the MATLAB
         * interpreter) evaluates that command in parallel on
         * each lab
         */
        evaluateCommand( command );
        /*
         * After each command, set this node/lab's state to be idle
         * (this node entered/reached the barrier synchronization
         * point and hence suspend execution)
         */
        setIdle( );
        /*
         * Then, wait for all other nodes/labs to become idle
         * (Wait for all other nodes/labs to enter/reach the
         * synchronization point)
         */
        waitForAllOthersToBeIdle( );
        /*
         * Finally, set the state to be running again
         * (resume execution)
         */
        setRunning( );
    }
}
```

In one embodiment of the present invention, the barrier synchronization point is different for each node. In other words, the nodes can execute a different number of lines of code before reaching a synchronization point. Hence, synchronization points can be assigned differently to different nodes to ensure the correct data are being communicated among the nodes to avoid data mismatch. In another embodiment of the present invention, a node only needs to wait for the nodes that the node communicates when the node reaches a synchronization point. There can be multiple barrier synchronization points in a single concurrent computing program. In one embodiment of the present invention, a barrier synchronization point is represented using a single instruction, such as a single function call. Alternatively, the barrier synchronization point can be represented using a series of instructions. One of ordinary skill in the art will recognize that every barrier synchronization point does not need to be the same. In other words, every barrier synchronization point can be implemented differently.

In step 406, the first node suspends execution of the concurrent computing program. The first node then optionally sends a message to the other nodes in the concurrent computing environment that it has entered the barrier synchronization point in step 408. For example, the following function can be used by a node to inform other nodes in the concurrent computing environment that it has reached the barrier synchronization point.

```
/*
 * Set idle - this is called at the end of a round of computation to
 * indicate to all the other nodes/labs that this node/lab has become
 * idle, and is no longer able to take part in any communication.
 * Alternatively, this can be implemented using delay instead of idle.
 */
void setIdle( ) {
    myState = IDLE;
    for( int i = 0; i < numlabs( ); i++ ) {
        /*
         * Send the idleness message to everybody except itself
         */
        if( i != thisLab( ) ) {
            /*
             * can use non-blocking communication here
             * nonBlockingSend - actually implemented using MPI_Isend
             * initiates a send to one of the other nodes/labs, and
             * returns immediately without waiting for the send to be
             * completed. The message is sent on the "idle communicator",
             * which means that idle state messages do not interfere
             * with other messages. If something other than MPI
             * were to be used for message passing, some other means of
             * distinguishing idle state messages from normal messages
             * would be needed.
             */
            nonBlockingSend( i, idleCommunicator );
        }
    }
}
```

```
/*
 * Set running - this is called after all nodes/labs are idle, to
 * clear control messages sent by setIdle( )
 */
void setRunning( ) {
    myState = RUNNING;
    for( int i = 0; i < numlabs( ); i++ ) {
        if( i != thisLab( ) ) {
            /*
             * Simply receive the incoming idle state message from
             * each other, and discard the contents.
             */
            receiveIncomingMessage( i, idleCommunicator );
        }
    }
}
/*
 * Also flush any incoming data messages that may be pending
 * - these represent communication mismatches in the program
 */
while( sendingLab = labProbe( ) ) {
    /*There is a message to receive - receive it... */
    labReceive( sendingLab );
    /*... and warn the user */
    warning( "an incoming message from lab %d was discarded",
            sendingLab );
}
}
```

The first node then checks if all the other nodes have entered the barrier synchronization point in step 410. If all the other nodes have entered the barrier synchronization point, then the first node resumes execution of the concurrent computing program in step 418. If all the other nodes have not entered the barrier synchronization point, then the first node waits for all the other nodes to enter the barrier synchronization point before resuming execution of the concurrent computing program in step 412. For example, the following function can be used by the first node to wait for other nodes to reach the barrier synchronization point.

```
/*
 * After a node/lab has been made idle, it waits for all other
 * nodes/labs to become idle, like this:
 */
void waitForAllOthersToBeIdle( ) {
    /*
     * Use a barrier synchronization point - in MPI is implemented
     * using MPI_Barrier.
     */
    barrierSynchronization( idleCommunicator );
}
```

Once all the nodes have entered the barrier synchronization point, any undelivered messages may be flushed in step 414 to ensure that before resuming to normal execution of the concurrent computing program in step 418, there are no messages buffered by the communication layer. Each message to be flushed represents a communication mismatch and a warning is issued. Moreover, any message received while the first node is waiting at the barrier synchronization point is discarded in step 416 before the first node resumes execution of the concurrent computing program in step 418. For example, the following function can be used to clean up any messages that are sent/received while waiting at the synchronization point.

Hence if there is an error due to communication mismatch, it would at least be detected when a node enters the barrier synchronization point. Before leaving the barrier synchronization point and resuming execution of the concurrent computing program, all messages in the send/receive buffer are flushed so that communication errors do not propagate beyond the barrier synchronization point. The concurrent computing nodes can then resume and continue execution of the concurrent computing program and communicate data with each other again. The concurrent computing application does not need to be aborted when a communication error is detected.

In one embodiment of the present invention, a state of the first node at the synchronization point is stored in step 420. When a communication mismatch is detected after the synchronization point, then the first node may return to the stored state. There may be multiple synchronization point used in a single concurrent computing program, then when a communication mismatch is detected, the concurrent computing nodes can return to the last synchronization point and re-execute the portion of the program where a communication mismatch is detected. Alternatively, the concurrent computing nodes can return the last synchronization point and allow a user to fix any error in the concurrent computing program before re-executing the portion where a communication mismatch is detected.

Figure 5:
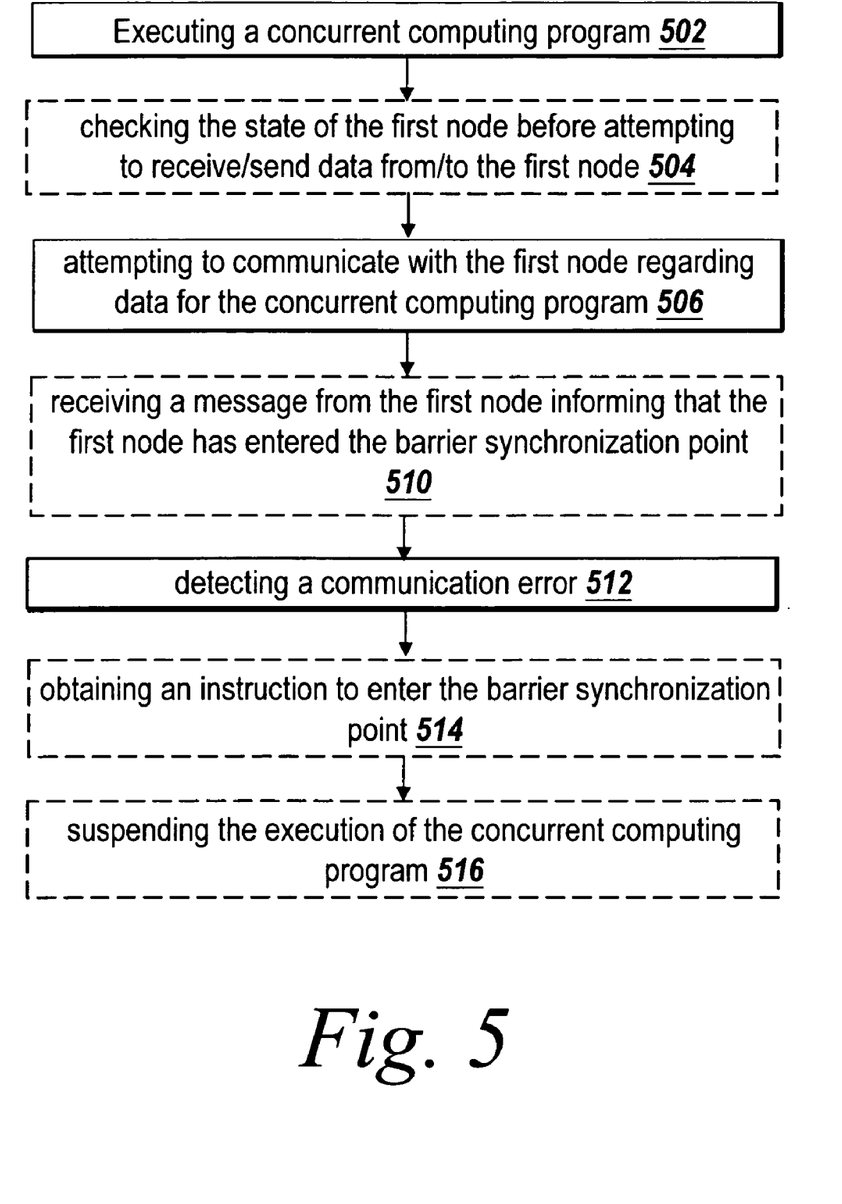
FIG. 5 illustrates a flowchart depicting steps taken when a node attempts to communication with another node that reaches a barrier synchronization point according to one embodiment of the present invention.

FIG. 5 illustrates a flow chart depicting steps taken to practice another aspect of the present invention. In a concurrent computing environment having multiple nodes, a second node executes a concurrent computing program in step 502. The second node wants to communicate with the first node regarding data for the concurrent computing program in step 506. The second node can optionally check the state of the first node before attempting to receive data from or send data to the first node in step 504. For example, the following function allows one to check the state of the node before attempting a communication.

```
/*
 * When a lab is waiting for a communication (such as to send or
 * receive a message) to complete, it can ask for the state of the
 * node/lab upon which it is dependent. For example, in a call to
 * receive a message from node/lab 3 by calling labReceive( 3 ),
 * the node/lab executing that call must check the state of
 * node/lab 3 - if that node/lab becomes idle before the message is
 * delivered, then we know that a communication mismatch has occurred.
 */
bool isOtherLabIdle( int otherLab ) {
  /*
   * checkForIncomingMessage( ) may be implemented using
   * MPI_Iprobe, and only returns true in this case if the other node/lab
   * has sent a message on the idle communicator to indicate that it has
   * become idle.
   */
  if( checkForIncomingMessage( otherLab, idleCommunicator ) ) {
    return true;
  } else {
    return false;
  }
}
```

The following is an example of how a node can receive a message from another node using one embodiment of the present invention.

```
/*
 * This shows how a node/lab can receive a message by
 * implementing a labReceive function, (ignoring the fact
 * that multiple messages are involved in a single call to
 * labReceive). This example is written in terms of MPI messages, but
 * any other message-passing system could equally well be used.
 */
void labReceive( int labToReceiveFrom ) {
  /*
   * The MPI_Request object allows us to check the state of a
   * communication request.
   */
  MPI_Request receiveRequestHandle;
  /*
   * Initiate the receive using a non-blocking call
   */
  MPI_Irecv( buf, ... other args ..., &receiveRequestHandle );
  /*
   * Loop while waiting for the receive request to complete
   */
  bool complete = false;
  while( !complete ) {
    /*
     * Check for idleness of the other lab
     */
    bool otherLabIdle = isOtherLabIdle( labToReceiveFrom );
    /*
     * Test to see if our receive has completed
     */
    MPI_Test( &receiveRequestHandle, &complete );
    /*
     * If our receive has not completed, but the other lab is
     * idle - that is a communication mismatch error.
     */
    if( !complete && otherLabIdle ) {
      /*
       * throwCommunicationMismatchError will inform the user
       * that their program has an error, and will let them know
       * which node/lab/application processes (such as a MATLAB
       * process) encountered that error.
       */
      throwCommunicationMismatchError( ... );
    }
  }
}
```

If the first node has already reached the barrier synchronization point before it can receive or send data, then the second node would detect a communication error in step 512.

Optionally, the second node can receive a message from the first node informing that the first node has entered the barrier synchronization point in step 510. This can occur before or after the second node attempts to communicate with the first node. If the first node that the second node wants to communicate with has already reached a synchronization point, then the second node would eventually obtain an instruction to enter the barrier synchronization point in step 514 as well. Then the second node would suspend execution of the concurrent program in step 516 until all nodes have reached the barrier synchronization point.

In another embodiment of the present invention, regions can be defined within a concurrent computing program to detect a communication mismatch. In one preferred embodiment of the present invention, the nodes do not suspend execution of their programs when they exit one region and enter another. The local copy of the concurrent program on each node is separated into one or more regions. One of ordinary skill in the art will appreciate that the overall program being executed can be the same on each node, but the exact code that is executed on each node may be different, such as conditional code that may require one lab to execute one portion of the program while another lab executes another portion. Alternatively, each node may execute a different program providing that the region definitions between the different programs are compatible. The local copies of the same program on different nodes may or may not have the same regions definition, but the regions definition on each node must be compatible. For example, given a program with a conditional code that has 10 lines of code, a first node may assign the first five lines to a first region while a second node may assign the next three lines of code to the same first region.

Two nodes can only communicate with each other when their regions are compatible. If their regions are not compatible, then there is a communication mismatch. In one embodiment of the present invention, each message communication that is sent would include information on the region the sending node is in. When the receiving node receives the message, it checks if the message has region information compatible with the current region of the receiving node. If the receiving node is in an incompatible region compared to the region information in the message, then an error occurs. Each communication is associated with a particular region and only nodes with compatible regions can communicate with each other.

In one embodiment of the present invention, when a node changes from a first region to a second region, a message is sent to other nodes in the concurrent computing environment to inform the new region that the node is in. In this case, if a receiving node with the current region as the first region is waiting to receive a message from the node that changes from the first region to the second region, then the receiving node knows that there is an error since the node has finished execution in the first region and the receiving node will never receive a message from the node while the node is in the first region. However, it is possible for a receiving node to start waiting to receive a message from a sending node when the sending node is still in an incompatible preceding region. At this point, an error is not raised because sending node can possibly get to the right region and send a message to the receiving node. By the time the receiving node actually receives a message from the sending node, the message can possibly be sent while the sending node is in a compatible region with the receiving node. If the region information of the sending node is packaged with the message, then the receiving node can check if the region information in the message is compatible with the current region that the receiving node is in. If the regions are not compatible, then an error is raised at this point. In another embodiment of the present invention, each node can optionally keep a record of the current regions that the other nodes are in. When regions are used to detect a communication mismatch, the nodes do not need to suspend execution when it leaves one region and enters another.

In one embodiment of the present invention, a compatible region means the same region. Alternatively, the definition of a compatible region can be different for each region in the concurrent computing program or concurrent computing node. One of ordinary skill in the art will appreciate that there can be many different ways in defining what a compatible region is and the specific examples mentioned herein should not be used to limit the scope of the present invention.

In one embodiment of the present invention, regions are automatically defined by the communication error detector 128 or application 120. The regions may also be manually defined by a user in the concurrent computing program. A counter variable or comments can be used to define regions. A function call can also be used to define the boundaries between regions, such as labRegionBoundary in the following example. A ruled-base system can also be used to define the regions. One of ordinary skill in the art will appreciate that there are many ways that one can define regions and the specific examples listed herein should not be used to limit the scope of the present invention.

In one embodiment of the present invention, the regions can have a temporal aspect. A region may be defined relative to time. In such a case, nodes can only communicate with each other, for example using MPI/RT, if they are in a compatible temporal region. The definition of temporal region can be different on each node in the concurrent computing environment as long as the definitions of temporal regions are compatible. One of ordinary skill in the art will appreciate that a barrier synchronization point can also be defined relative to time. For example, the end of a 10 millisecond fragment of data can be used as a barrier synchronization point. If one of the labs returns a result before the 10 milliseconds have passed, this may indicate that an error has occurred. One of ordinary skill in the art will appreciate that other operations may be performed on data with a real-time aspect.

In one embodiment of the present invention, each region has an identification number. The identification number can be an integer or other suitable numerical representation. Alternatively, each region can also be identified using alphabets, characters, symbols, or other suitable representation. One of ordinary skill in the art will appreciate that the scope of the present invention is not limited to the specific identification system for the regions mentioned herein and other suitable representation can also be used to identify the different regions.

The following pseudo code illustrates one way of implementing regions using the present invention. The following example assumes that MPI is used with MATLAB® to implement regions.

```
/*
 * Region-based code for early error detection. In this case, rather
 * than use a barrier synchronization point to divide the user code
 * into sections which must have communication consistency, we divide
 * the program into regions. In this simple example, we assume that
 * "regions" are non-nesting. Numbers such as integers can be used
 * to define which region a lab is in. A communication mismatch
 * is detected whenever a lab attempts to communicate with another
 * lab which cannot possibly satisfy the communication request
 * because it has progressed to a following region.
 *
 * Note that a lab attempting to communicate with another lab which
 * is currently in a preceding region is OK - the other lab will
 * (presumably) eventually get to the same region.
 *
 * Another possible error condition is where a lab receives a message
 * from another lab where the sending lab sent the message from a
 * different region to the one the receiver is currently executing.
 */
/*
 * This array is updated periodically to reflect the latest known
 * region numbers of all nodes/labs. The array has numlabs elements.
 */
static int latestRegions[ ];
/*
 * This method updates the latest regions array from messages sent by
 * other nodes/labs when they encounter labRegionBoundary( ).
 */
void updateLatestRegions( ) {
    /*
     * regionMessageIsAvailable( ) uses something like MPI_Iprobe to
     * detect the presence of a message
     */
    while( regionMessageIsAvailable( ) ) {
        /*
         * This will be set to the lab which is sending us a region
         * update message
         */
        int updatingLab;
        /*
         * This will be set to the region on that lab
         */
        int updatedRegionIdx;
        /*
         * Use something like MPI_Recv to receive the message
         */
        readRegionMessage( &updatingLab, &updatedRegionIdx );
        /*
         * Update our array
         */
        latestRegions[updatingLab] = updatedRegionIdx;
    }
}
/*
 * This method is called when the user's M-code calls
 * "labRegionBoundary". Note that this method does not perform
 * any synchronization, and execution continues immediately.
 */
void labRegionBoundary( ) {
    /*
     * Firstly, increment my region counter
     */
    latestRegions[thisLab( )]++;
    /*
     * Then, send that value to all other labs
     */
    for( int i = 0; i < numlabs( ); i++ ) {
        if( i != thisLab( ) ) {
            /*
             * nonBlockingSend - actually implemented using MPI_Isend
             * -initiates a send of the latest region index from this
             * lab to all other labs
             */
            nonBlockingSend( i, latestRegions[thisLab( )] );
        }
    }
}
/*
 * Here's an outline of how labReceive can work in the case where
 * region-checking is done (ignoring the fact that multiple messages
 * are involved in a single call to labReceive). This is written in
 * terms of MPI messages, but any other message-passing system could
 * equally well be used.
 */
void labReceive( int labToReceiveFrom ) {
    /*
     * The MPI_Request object allows the checking of the state of a
     * communication request.
```

```
*/
MPI_Request receiveRequestHandle;
/*
* Initiate the receive using a non-blocking call
*/
MPI_Irecv( buf, ... other args ..., &receiveRequestHandle );
/*
* Loop while waiting for the receive request to complete
*/
bool complete = false;
while( !complete ) {
    /*
    * Update local data on what regions the other labs are
    * currently executing
    */
    updateLatestRegions( );
    /*
    * Test to see if receive has completed
    */
    MPI_Test( &receiveRequestHandle, &complete );
    /*
    * If receive has not completed, and the other lab has
    * entered a later region, then flag an error.
    */
    if( !complete && ( latestRegions[otherLab] >
    latestRegions[thisLab( )] ) ) {
        /*
        * throwCommunicationMismatchError will inform the user
        * that the program has an error, and will let the user
        * know which MATLAB processes encountered that error.
        */
        throwCommunicationMismatchError( ... );
    }
}
/*
* If execution gets here, then a message is received - but
* now must make sure that it was sent from the correct
* region. The message buffer contains information about the
* region from which the message was sent (labSend packs the
* information into the buffer), which can be checked as follows:
*/
if( getSendingRegionFromMessageBuffer( buf ) !=
latestRegions[thisLab( )] ) {
    throwCommunicationMismatchError( ... );
}
}
```

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A computer-implemented method for communicating among a plurality of nodes in a concurrent computing environment, the nodes communicating using one or more messages, at least some of the messages buffered in a buffer before delivery to one or more of the nodes, the method comprising:
   executing a concurrent computing program;
   obtaining an instruction by a first one of the plurality of nodes, the instruction for entering a barrier synchronization point;
   suspending execution of the concurrent computing program on the first one of the plurality of nodes;
   resuming execution of the concurrent computing program on the first one of the plurality of nodes when all the plurality of nodes have entered the barrier synchronization point;
   detecting a communication mismatch after the first one of the plurality of nodes has entered the barrier synchronization point; and
   flushing one or more undelivered messages from the buffer before resuming execution of the concurrent computing program when the first one of the plurality of nodes has entered the barrier synchronization point.

2. The method of claim 1, further comprising:
   sending a message by the first node to all other nodes in the plurality of nodes to inform that the first node has entered the barrier synchronization point.

3. The method of claim 1, further comprising:
   checking if all other nodes in the plurality of nodes have entered the barrier synchronization point.

4. The method of claim 3, if a second node in the plurality of nodes has not entered the barrier synchronization point, the method further comprising:
   waiting for the second node to enter the barrier synchronization point before resuming execution of the concurrent computing program.

5. The method of claim 1, further comprising:
   discarding any message received during suspension of the execution of the concurrent computing program before resuming execution of the concurrent computing program.

6. The method of claim 1, further comprising:
   storing a state of first node at the barrier synchronization point; and
   restoring to the stored state when the communication mismatch is detected.

7. The method of claim 1, wherein at least a subset of the computing program comprises commands in a MATLAB-compatible language.

8. The method of claim 1, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

9. A method for detecting a communication error among a plurality of nodes in a concurrent computing environment, the nodes communicating with one or more messages, at least some of the messages buffered in a buffer before delivery to one or more of the nodes, the method comprising:
   executing a concurrent computing program;
   attempting to communicate with a first one of the plurality of nodes regarding data for the concurrent computing program, wherein the first one of the plurality of nodes has entered a barrier synchronization point;
   detecting a communication error related to the attempt to communicate; and
   flushing any undelivered messages from the buffer before resuming execution of the concurrent computing program when the first one of the plurality of nodes has entered the barrier synchronization point.

10. The method of claim 9, wherein the attempted communication is to send data to the first one of the plurality of nodes.

11. The method of claim 9, wherein the attempted communication is to receive data from the first one of the plurality of nodes.

12. The method of claim 11, further comprising:
    checking the state of the first node before attempting to receive data from the first one of the plurality of nodes.

13. The method of claim 9, further comprising:
    receiving a message from the first one of the plurality of nodes informing that the first one of the plurality of nodes has entered the barrier synchronization point.

14. The method of claim 9, further comprising:
obtaining an instruction to enter the barrier synchronization point; and
suspending the execution of the concurrent computing program.

15. The method of claim 9, wherein at least a subset of the computing program comprises commands in a MATLAB-compatible language.

16. The method of claim 9, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

17. A computer-readable storage medium storing computer-executable instructions that when executed by a processor cause communication among a plurality of nodes in a concurrent computing environment, the instructions including instructions for:
executing a concurrent computing program;
obtaining an instruction by a first one of the plurality of nodes to enter a barrier synchronization point;
suspending execution of the concurrent computing program on the first one of the plurality of nodes;
resuming execution of the concurrent computing program on the first one of the plurality of nodes when all the plurality of nodes have entered the barrier synchronization point;
detecting a communication mismatch after the first one of the plurality of nodes has entered the barrier synchronization point; and
discarding any message received during suspension of the execution of the concurrent computing program before resuming execution of the concurrent computing program on the first one of the plurality of nodes.

18. The medium of claim 17, further comprising instruction for: sending a message by the first one of the plurality of nodes to all other nodes in the plurality of nodes to inform that the first one of the plurality of nodes has entered the barrier synchronization point.

19. The medium of claim 17, further comprising instruction for:
checking if all other nodes in the plurality of nodes have entered the barrier synchronization point.

20. The medium of claim 19, the medium further comprising instruction for:
waiting for a second one of the plurality of nodes to enter the barrier synchronization point before resuming execution of the concurrent computing program on the first one of the plurality of nodes if the second one of the plurality of nodes has not yet entered the barrier synchronization point.

21. The medium of claim 17, further comprising instruction for: flushing any undelivered messages before resuming execution of the concurrent computing program on the first one of the plurality of nodes.

22. The medium of claim 17, further comprising instruction for: storing a state of first node at the barrier synchronization point; and returning to the stored state upon detection of the communication mismatch.

23. The medium of claim 17, wherein at least a subset of the computing program comprises commands in a MATLAB-compatible language.

24. The medium of claim 17, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

25. A computer-readable storage medium storing computer-executable instructions that when executed by a processor cause a computing device to detect a communication error among a plurality of nodes in a concurrent computing environment, the nodes communicating with one or more messages, at least some of the messages buffered in a buffer before delivery to one or more of the nodes, the instructions include instructions for:
executing a concurrent computing program;
attempting to communicate with a first one of the plurality of nodes regarding data for the concurrent computing program, wherein the first one of the plurality of nodes has entered a barrier synchronization point;
detecting a communication error related to the attempt to communicate; and
flushing any undelivered messages from the buffer before resuming execution of the concurrent computing program when the first one of the plurality of nodes has entered the barrier synchronization point.

26. The medium of claim 25, wherein the attempted communication is to send data to the first one of the plurality of nodes.

27. The medium of claim 25, wherein the attempted communication is to receive data from the first one of the plurality of nodes.

28. The medium of claim 27, further comprising the instruction for:
checking the state of the first one of the plurality of nodes before attempting to receive data from the first one of the plurality of nodes.

29. The medium of claim 25, further comprising the instruction for:
receiving a message from the first one of the plurality of nodes informing that the first one of the plurality of nodes has entered the barrier synchronization point.

30. The medium of claim 25, further comprising the instruction for:
obtaining an instruction to enter the barrier synchronization point; and
suspending the execution of the concurrent computing program.

31. The medium of claim 25, wherein at least a subset of the computing program comprises commands in a MATLAB-compatible language.

32. The medium of claim 25, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

33. A system for detecting a communication error among a plurality of nodes in a concurrent computing environment, the nodes communicating with one or more messages, at least some of the messages buffered in a buffer before delivery to one or more of the nodes, the system comprising:
a plurality of nodes executing a concurrent computing program; and
a communication error detector inserting a barrier synchronization point in the concurrent computing program to check for communication error among the plurality of nodes, wherein the communication error detector detects an error when a first one of the plurality of nodes attempts to communicate with a second one of the plurality of nodes when the second one of the plurality of nodes has reached the barrier synchronization point, and any undelivered messages are flushed from the buffer before resuming execution of the concurrent computing program.

34. The system of claim 33, wherein the barrier synchronization point for the first one of the plurality of nodes is different in position than the barrier synchronization point for the second one of the plurality of nodes.

35. The system of claim 33, wherein the barrier synchronization point has an instruction to suspend execution of the concurrent computing program.

36. The system of claim 33, wherein the attempted communication is a communication for sending or receiving data.

37. The system of claim 33, wherein at least a subset of the computing program comprises commands in a MATLAB-compatible language.

38. The system of claim 33, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

39. A method for detecting a communication mismatch between two nodes in a concurrent computing environment, the nodes communicating with one or more messages, at least some of the messages buffered in a buffer before delivery to one or more of the nodes, the method comprising:
    executing a concurrent computing program; and
    sending a message by a sending node to a receiving node, the message including information identifying a region the sending node is in;
    detecting a communication mismatch between the sending node and the receiving node; and
    flushing any undelivered messages from the buffer when the first one of the plurality of nodes has entered the barrier synchronization point before resuming execution of the concurrent computing program.

40. The method of claim 39, wherein detecting the communication mismatch comprises receiving an error indicating that the message is received with error due to an incompatible region that the receiving node is in.

41. The method of claim 39, further comprising:
    detecting a change in the region that the sending node is in, the region changing from a first region to a second region; and
    informing the receiving node that the sending node is in a second region.

42. The method of claim 39, wherein at least a subset of the computing program comprises commands in a MATLAB-compatible language.

43. The method of claim 39, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

44. A method for communicating between two nodes in a concurrent computing environment, the nodes communicating with one or more messages, at least some of the messages buffered in a buffer before delivery to one or more of the nodes, the method comprising:
    executing a concurrent computing program;
    querying a current region of a receiving node by a sending node, wherein if the current region of the receiving node is compatible with a current region of the sending node, a message is sent from the sending node to the receiving node, and if the current region of the receiving node is incompatible with the current region of the sending node, an error is received identifying a communication mismatch, wherein any undelivered messages are flushed from the buffer when the error is received.

45. The method of claim 44, wherein at least a subset of the computing program comprises commands in a MATLAB-compatible language.

46. The method of claim 44, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

47. A method for communicating between two nodes in a concurrent computing environment, the nodes communicating with one or more messages, at least some of the messages buffered in a buffer before delivery to one or more of the nodes, the method comprising:
    executing a concurrent computing program;
    querying a current region of a sending node by a receiving node; and if the current region of the sending node is compatible with a current region of the receiving node, receiving a message from the sending node by the receiving node, and if the current region of the sending node is incompatible with the current region of the receiving node, an error is received identifying a communication mismatch, wherein any undelivered messages are flushed from the buffer when the error is received.

48. The method of claim 47, wherein at least a subset of the computing program comprises commands in a MATLAB-compatible language.

49. The method of claim 47, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

50. A system for detecting a communication error among a plurality of nodes in a concurrent computing environment, the nodes communicating with one or more messages, at least some of the messages buffered in a buffer before delivery to one or more of the nodes, the system comprising:
    a plurality of nodes; and
    a communication error detector dividing a concurrent computing program into one or more regions to check for communication error among the plurality of nodes, the communication error detector detecting an error when a first one of the plurality of nodes attempts to communicate with a second one of the plurality of nodes when a region of the first one of the plurality of nodes is not compatible with a region of the second one of the plurality of nodes, wherein any undelivered messages are flushed from the buffer when the error is detected.

51. The system of claim 50, wherein the first one of the plurality of nodes attempts to send a message to the second one of the plurality of nodes, and information regarding the region of the first node is included in the message.

52. The system of claim 50, wherein at least a subset of the computing program comprises commands in a MATLAB-compatible language.

53. The system of claim 50, wherein at least one of the plurality of nodes is at least one or a combination of: a multi-core processor, a Field Programmable Gate Array (FPGA), a processor, an Application Specific Instruction set Processor (ASIP), an Application Specific Integrated Circuit (ASIC), a grid, and a computing cluster.

* * * * *

UNITED STATES PATENT AND TRADEMARK OFFICE
CERTIFICATE OF CORRECTION

| | | |
|---|---|---|
| PATENT NO. | : 7,925,791 B2 | Page 1 of 1 |
| APPLICATION NO. | : 11/488432 | |
| DATED | : April 12, 2011 | |
| INVENTOR(S) | : Edric Ellis et al. | |

It is certified that error appears in the above-identified patent and that said Letters Patent is hereby corrected as shown below:

In the Specification

At column 5, line 49, change "to communication" with -- to communicate --.

At column 6, line 35, change "Univeristy" to -- University --.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 7,925,791 B2 | Page 1 of 1 |
| APPLICATION NO. | : 11/488432 | |
| DATED | : April 12, 2011 | |
| INVENTOR(S) | : Edric Ellis et al. | |

It is certified that error appears in the above-identified patent and that said Letters Patent is hereby corrected as shown below:

Title Page, Item (73) Assignee, replace "The Math Works, Inc." with --The MathWorks, Inc.--

Signed and Sealed this
Twentieth Day of January, 2015

Michelle K. Lee
*Deputy Director of the United States Patent and Trademark Office*